United States Patent
Zhou et al.

(10) Patent No.: US 9,401,027 B2
(45) Date of Patent: Jul. 26, 2016

(54) METHOD AND APPARATUS FOR SCENE SEGMENTATION FROM FOCAL STACK IMAGES

(71) Applicant: Nokia Technologies Oy, Espoo (FI)

(72) Inventors: Hui Zhou, Sunnyvale, CA (US); Timo Ahonen, Redwood City, CA (US); Karim Benchemsi, Malmö (SE); Tobias Karlsson, Malmö (SE); Amer Mustajbasic, Lund (SE); Johan Windmark, Lund (SE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/058,819

(22) Filed: Oct. 21, 2013

(65) Prior Publication Data

US 2015/0110391 A1    Apr. 23, 2015

(51) Int. Cl.
*G06T 7/00* (2006.01)
*G06T 7/40* (2006.01)

(52) U.S. Cl.
CPC ............ *G06T 7/0081* (2013.01); *G06T 7/0093* (2013.01); *G06T 7/0097* (2013.01); *G06T 7/408* (2013.01); *G06T 2207/10004* (2013.01); *G06T 2207/10016* (2013.01); *G06T 2207/10024* (2013.01); *G06T 2207/10148* (2013.01); *G06T 2207/20016* (2013.01); *G06T 2207/20076* (2013.01); *G06T 2207/20104* (2013.01); *G06T 2207/20144* (2013.01); *G06T 2207/20156* (2013.01)

(58) Field of Classification Search
None
See application file for complete search history.

(56) References Cited

U.S. PATENT DOCUMENTS

| | | | |
|---|---|---|---|
| 7,599,555 B2 * | 10/2009 | McGuire et al. | 382/173 |
| 8,988,542 B2 * | 3/2015 | Saito | 348/222.1 |
| 2008/0131019 A1* | 6/2008 | Ng | 382/255 |
| 2010/0226566 A1* | 9/2010 | Luo et al. | 382/164 |
| 2011/0069939 A1 | 3/2011 | Choi et al. | |
| 2011/0157408 A1* | 6/2011 | Steinberg | G06K 9/00248 348/222.1 |

(Continued)

FOREIGN PATENT DOCUMENTS

| | | |
|---|---|---|
| CN | 103177450 A | 6/2013 |
| WO | WO-2013/089662 A1 | 6/2013 |
| WO | WO 2014/193377 A1 * | 12/2014 ................ G06T 3/00 |

OTHER PUBLICATIONS

Reinhard, Erik, and Erum Arif Khan. "Depth-of-field-based alpha-matte extraction." Proceedings of the 2nd symposium on Applied perception in graphics and visualization. ACM, 2005.*

(Continued)

*Primary Examiner* — Siamak Harandi
*Assistant Examiner* — Narek Zohrabyan
(74) *Attorney, Agent, or Firm* — Alston & Bird LLP (57) ABSTRACT

A method, apparatus and computer program product are provided to facilitate scene segmentation from focal stack images. The method may include receiving a set of focal stack images, calculating a focal measure for each of a plurality of pixels of the set of focal stack images, and grouping each of a plurality of pixels for which the focal measure was calculated into a plurality of super pixels. The method may also include calculating a focal measure for each of the plurality of super pixels, segmenting a respective focal stack image based on the focal measure of each of the plurality of super pixels, calculating a color probability for each of the plurality of super pixels, and segmenting each focal stack image based on color probability of each of the plurality of super pixels.

23 Claims, 8 Drawing Sheets

(56) References Cited

U.S. PATENT DOCUMENTS

| | | | |
|---|---|---|---|
| 2012/0201460 A1 | 8/2012 | Seo | |
| 2012/0251003 A1* | 10/2012 | Perbet et al. | 382/173 |
| 2012/0301017 A1 | 11/2012 | Freedman | |
| 2013/0307966 A1* | 11/2013 | Komatsu | 348/135 |
| 2014/0079336 A1* | 3/2014 | Venkataraman et al. | 382/275 |
| 2014/0267618 A1* | 9/2014 | Esteban et al. | 348/46 |
| 2015/0062370 A1* | 3/2015 | Shroff et al. | 348/222.1 |

OTHER PUBLICATIONS

Lu, Le, and Gregory D. Hager. "A nonparametric treatment for location/segmentation based visual tracking." Computer Vision and Pattern Recognition, 2007. CVPR'07. IEEE Conference on. IEEE, 2007.*

Ajdin, Boris, and Timo Ahonen. "Reduced depth of field using multi-image fusion." IS&T/SPIE Electronic Imaging. International Society for Optics and Photonics, 2013.*

Yang, Changjiang, et al. "Improved fast Gauss transform and efficient kernel density estimation." Computer Vision, 2003. Proceedings. Ninth IEEE International Conference on. IEEE, 2003.*

Achanta, Radhakrishna, et al. "SLIC superpixels compared to state-of-the-art superpixel methods." Pattern Analysis and Machine Intelligence, IEEE Transactions on 34.11 (2012): 2274-2282.*

Favaro, Paolo, et al. "Shape from defocus via diffusion." Pattern Analysis and Machine Intelligence, IEEE Transactions on 30.3 (2008): 518-531.*

Achanta, R., et al., "*SLIC Superpixels Compared to State-of-the-art Superpixel Methods;*" IEEE Transactions on Pattern Analysis and Machine Intelligence, vol. 34, Issue. 11; p. 2274-2282; dated May 2012; Abstract retrieved on Oct. 28, 2013 from <https://www.researchgate.net/publication/225069465_SLIC_Superpixels_Compared_to_State-of-the-art_Superpixel_Methods>.

Ajdin, B., et al.; "*Reduced depth of field using multi-image fusion;*" Proceedings SPIE 8667, Multimedia Content and Mobile Devices, 86671T; dated Mar. 7, 2013; retrieved on Oct. 28, 2013 from <proceedings.spiedigitallibrary.prg/proceedings.aspx?articleid=1662502>.

Boykov, Y. et al.; "*Fast approximate energy minimization via graph cuts;*" IEEE Transactions on Pattern Analysis and Machine Intelligence, vol. 23, Issue 11; pp. 1-18; dated Nov. 2001; retrieved on Oct. 28, 2013 from <http://www.cs.cornell.edu/rdz/Papers/BVZ-pami01-final.pdf>.

Boykov, Y., et al.; "*Interactive graph cuts for optimal boundary and region segmentation of objects in n-d images;*" International Conference on Computer Vision, vol. I; pp. 105-112; dated Jul. 2001; retrieved on Oct. 28, 2013 from <ftp://ftp.umiacs.umd.edu/.snapshot/hourly.0/pub/chenxi/Project%20FTP/OLD/Submodular/Graphcut_boykov-iccv-01.pdf>.

Favaro, P. et al., "*Shape from Defocus via Diffusion;*" IEEE Transactions on Pattern Analysis and Machine Intelligence, vol. 30 Issue 3; dated Mar. 2008; abstract retrieved on Oct. 28, 2013 from < http:dl.acm.org/citation.cfm?id=1340088.1340256>.

Jacobs, D. E., et al.; "*Focal Stack Compositing for Depth of Field Control;*" Stanford Computer Graphics Laboratory Technical Report 2012-1; dated 2012; retrieved on Oct. 28, 2013 from <http://graphics.stanford.edu/papers/focalstack/focalstack.pdf.>.

Levin, A. et al.; "*A Closed Form Solution to Natural Image Matting;*" IEEE Conference on Computer Vision and Pattern Recognition, Vo. 30, No. 2; dated Feb. 2008; retrieved on Oct. 28, 2013 from <http://www.wisdom.weizmann.ac.il/~levina/papers/Matting-Levin-Lischinski-Weiss-CVPR06.pdf>.

Vaquero, D. A., et al.; "*Generalized autofocus;*" IEEE Workshop on Applications of Computer Vision (WACV); dated Jan. 2011; retrieved on Oct. 28, 2013 from <http://people.csail.mit.edu/kapu/papers/VaqueroWACV11.pdf>.

Yang C., et al.; "*Improved fast gauss transform and efficient kernel density estimation;*" IEEE International Conference on Computer Vision; pp. 664-671; dated 2003; abstract retrieved on Oct. 28, 2013 <http://dl.acm.org/citation.cfm?id=946593>.

Nokia Application entitled *Image Refocusing*; first named inventor Zhou; filed in World Intellectual Property Organization, May 30, 2013, WO2014/193377 A1.

Extended European Search Report for Application No. 14 18 9481.6 dated Mar. 13, 2015.

Davis L S et al.; "Efficient Kernel Density Estimation Using the Fast Gauss Transform with Applications to Color Modeling and Tracking"; *IEEE Transactions on Pattern Analysis and Machine Intelligence, IEEE Computer Society, USA*; vol. 25, No. 11; Nov. 1, 2003; pp. 1499-1504; XP011103002.

Li Yin et al.; "LazySnapping"; *ACM Transactions on Graphics (TOG)*; vol. 23, No. 3, Jan. 1, 2004; pp. 303-308; XP009099127.

Neverova, Natalia et al.; "Edge-Based Method for Sharp Region Extraction From Low Depth of Field Images"; *Visual Communications and Image Processing (VCIP)*; Nov. 27, 2012; pp. 1-6; XP032309192.

Pertuz, Said et al.; "Analysis of Focus Measure Operators for Shape-From-Focus"; *Pattern Recognition*; vol. 46, No. 5; May 1, 2013; pp. 1415-1432; XP055173399.

\* cited by examiner

METHOD AND APPARATUS FOR SCENE SEGMENTATION FROM FOCAL STACK IMAGES

TECHNOLOGICAL FIELD

An example embodiment of the present invention relates generally to image manipulation and segmentation and, more particularly, to scene segmentation from focal stack images.

BACKGROUND

Modern digital cameras may provide the capability of capturing multiple focal stack images. Each of the focal stack images may focus on a different focus plane. The focus information allows segmentation of the foreground and background of the focal stack images.

Conventionally, a focus measure is calculated for each pixel, classifying each sharp pixel as foreground and each blurry pixel as background. However the per pixel focus measurement is not always reliable, especially in areas with depth discontinuity and texture weak areas. Further, the segmentation calculations are inefficient when using sophisticated segmentation techniques. For example, if graph-cut algorithm is used, each pixel will form a node on the graph, making the graph extremely large resulting in long computation time.

There is a lack of balance between incorporating user input into the segmentation calculations and minimizing user burden. User input is either not used in the calculations, or the user input requires significant detail and is burdensome to the user.

BRIEF SUMMARY

A method, apparatus and computer program product are provided in accordance with an example embodiment in order to facilitate the scene segmentation from focal stack images. As such, a set of focal stack images may have its associated pixels grouped into super pixels. A focal measurement and color probability may be calculated for each super pixel. The super pixels may be segmented based on the focal measurement and for the color probability.

In an example embodiment, a method is provided that includes receiving a set of focal stack images; calculating a focal measure for each of a plurality of pixels of the set of focal stack images; grouping each of a plurality of pixels for which the focal measure was calculated into a plurality of super pixels; calculating a focal measure for each of a plurality of the super pixels; segmenting a respective focal stack image based on the focal measures of the plurality of super pixels; calculating a color probability for respective super pixels; and segmenting the respective focal stack image based on the color probability of respective super pixels.

The method of an example embodiment may also include selecting a representative plurality of focal images from the set of focal stack images. The method of an example embodiment may also include aligning the set of focal stack images. In another example embodiment the method may also include receiving a selection of a focus frame; wherein the segmenting the respective focal stack image based on focal measure is further based on the selected focus frame; and wherein the segmenting the respective focal stack image based on color probability is further based on the selected focus frame.

The method of an example embodiment may also include classifying the plurality of super pixels as foreground or background. The example embodiment of the method may also include shrinking the segmentation mask consisting of multiple super pixels based on classification as background or foreground. In another example embodiment the method may also include removing island pixels based on classification as background or foreground; and setting matting layers based on pixel classification as background or foreground. In another example embodiment an apparatus is provided that includes a processor and a memory including computer program code, the memory and computer program code configured to, with the processor, cause the apparatus to receive a set of focal stack images; calculate a focal measure for each of a plurality of pixels of the set of focal stack images; group each of a plurality of pixels for which the focal measure was calculated into a plurality of super pixels; calculate a focal measure for each of a plurality of the super pixels; segment a respective focal stack image based on the focal measures of the plurality of super pixels; calculate a color probability for respective super pixels; and segment the respective focal stack image based on the color probability of respective super pixels.

The memory and computer program code may be configured to, with the processor, cause the apparatus of an example embodiment to select a representative plurality of focal images from the set of focal stack images. The memory and computer program code may be configured to, with the processor, cause the apparatus of an example embodiment to align the set of focal stack images. The memory and computer program code may also be configured to, with the processor, cause the apparatus of an example embodiment to receive a selection of a focus frame; wherein the segmenting the respective focal stack image based on focal measure is further based on the selected focus frame; and wherein the segmenting the respective focal stack image based on color probability is further based on the selected focus frame.

The memory and computer program code may be configured to, with the processor, cause the apparatus of an example embodiment to classify the plurality of super pixels as foreground or background. The memory and computer program code may be configured to, with the processor, cause the apparatus of an example embodiment to shrink segmentation mask consisting of multiple super pixels based on classification as background or foreground. The memory and computer program code may also be configured to, with the processor, cause the apparatus of an example embodiment remove island pixels based on classification as background or foreground; and set matting layers based on pixel classification as background or foreground.

In a further embodiment, a computer program product is provided that includes a non-transitory computer readable medium having program code portions stored thereon, the program code portions configured, upon execution to receive a set of focal stack images; select a representative plurality of focal images from the set of focal stack images; calculate a focal measure for each of a plurality of pixels of the set of focal stack images; group each of a plurality of pixels for which the focal measure was calculated into a plurality of super pixels; calculate a focal measure for each of a plurality of the super pixels; segment a respective focal stack image based on the focal measures of the plurality of super pixels; calculate a color probability for respective super pixels; and segment the respective focal stack image based on the color probability of respective super pixels.

The program code portions of an example embodiment may also be configured, upon execution, to select a representative plurality of focal images from the set of focal stack images; and align the set of focal stack images. The program code portions of an example embodiment may also be configured, upon execution, to receive a selection of a focus frame; wherein the segmenting the respective focal stack image based on focal measure is further based on the selected focus frame; and wherein the segmenting the respective focal stack image based on color probability is further based on the selected focus frame.

The program code portions of an example embodiment may also be configured, upon execution, to classify the plurality of super pixels as foreground or background. The program code portions of an example embodiment may be configured, upon execution, to shrink segmentation mask consisting of multiple super pixels based on classification as background or foreground. The program code portions of an example embodiment may also be configured, upon execution, to remove island pixels based on classification as background or foreground; and set matting layers based on pixel classification as background or foreground.

In yet another example embodiment, an apparatus is provided that includes means for receiving a set of focal stack images; means for calculating a focal measure for each pixel of the set of focal stack images; means for grouping each pixel in each of the set of focal stack images into a plurality of super pixels; means for calculating a focal measure for each of the plurality of super pixels; means for segmenting each focal stack image based on the focal measure of each of the plurality of super pixels; means for calculating a color probability for each of the plurality of super pixels; and means for segmenting each focal stack image based on color probability of each of the plurality of super pixels.

BRIEF DESCRIPTION OF THE SEVERAL VIEWS OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Figure 1:
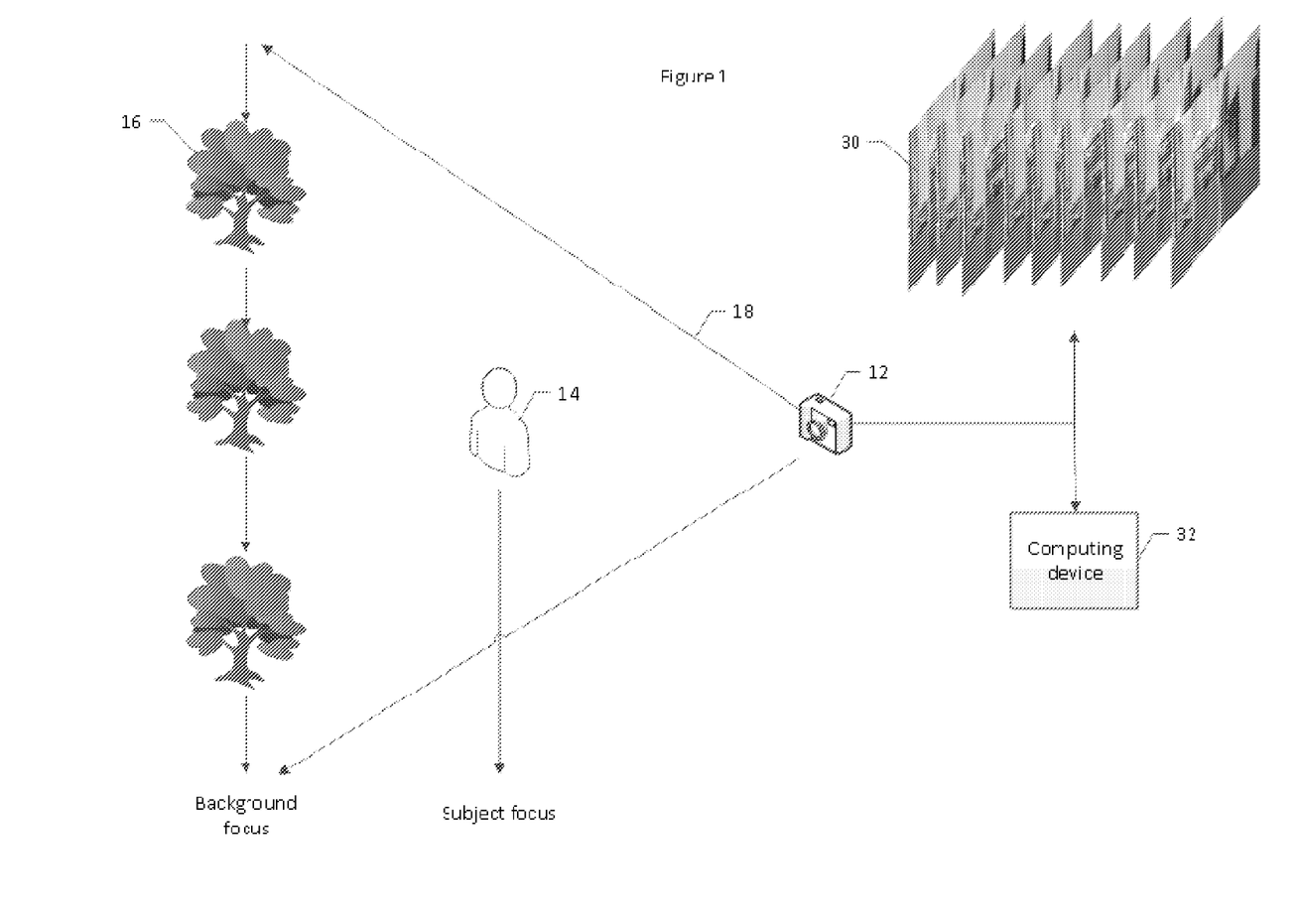
FIG. 1 is a representation of a camera field of vision and focus planes in accordance with an example embodiment of the present invention.

A method, apparatus and computer program product are provided in accordance with an example embodiment for scene segmentation of focal stack images 30. A camera 12 may capture multiple focal stack images 30 in which each image focuses on a different focus plane. A camera may include any device equipped to capture a digital image including without limitation, a digital camera, a video camera, a personal data assistant (PDA), a mobile phone, a smart phone, tablet computer, laptop computer, web-cam, or the like. Each focal stack image may capture the field of vision 18 of the camera including the subject 14 and background 16. Focus planes may include a subject 14 focus plane, a background 16 focus plane, or the like.

The camera 12 may perform the scene segmentation of the focal stack images or the focal stack images may be transferred to a computing device 32 for scene segmentation. If the scene segmentation is performed by the computing device, after the process has been completed the computing device may send the image to the camera 12 for storage and/or viewing, cause the image to be stored in a memory, or cause the image to be displayed for viewing. A computing device may include without limitation, a desktop computer, a laptop computer, a tablet computer, a PDA, a smart phone, a digital camera, a video camera, or the like. The camera 12 or computing device 32 may receive a set of focal stack images 30 for scene segmentation. Scene segmentation may include, without limitation, receiving the focal stack images, calculating pixel focus measure, grouping pixels into super pixels, calculating super pixel focus measure, segmenting images based on focal measure, calculating color probability, segmenting images based on color, or the like. Optionally, scene segmentation may include selecting representative focal images, selecting a focus frame, aligning focal images, classifying super pixels as foreground or background, hole filling and island removal, setting matting layers based on super pixel classification, or the like.

Figure 2:
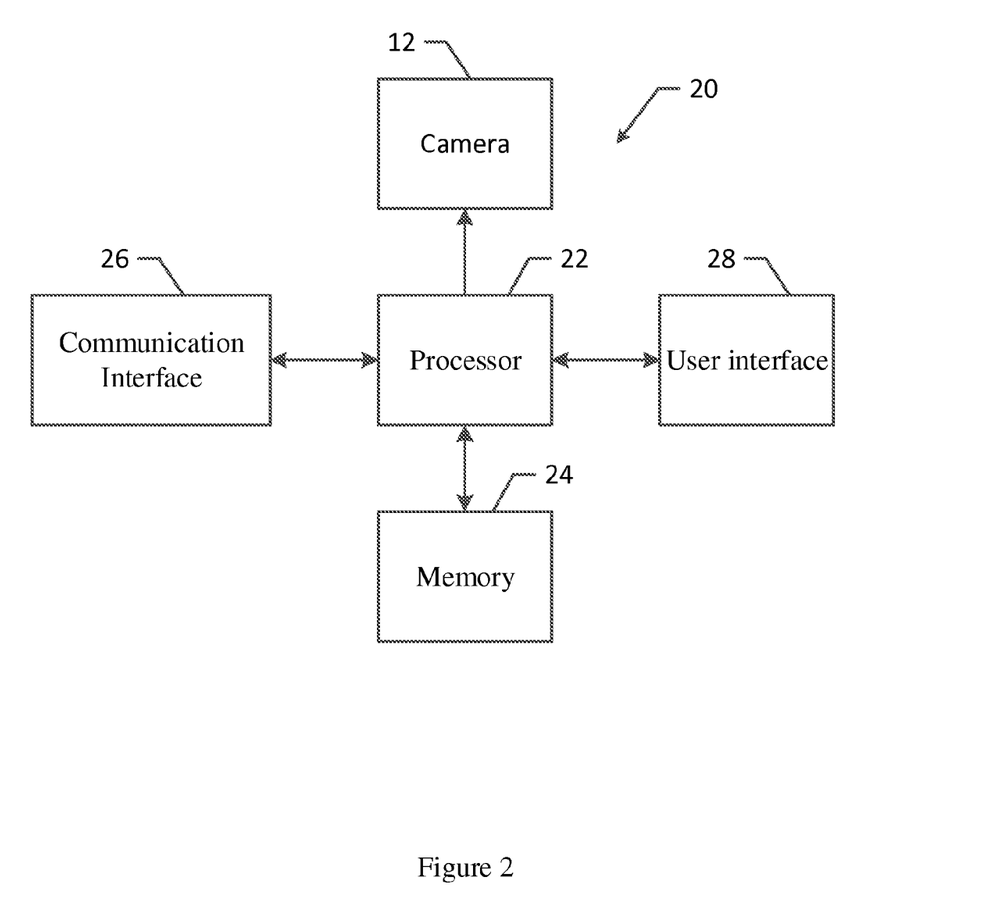
FIG. 2 is a block diagram of an apparatus that may be specifically configured in order to automatically identify one or more media files for transfer to an output device for presentation in accordance with an example embodiment of the present invention.

As shown in FIG. 2, an apparatus 20 may be provided in accordance with an example embodiment of the present invention that may be embodied by any of a variety of devices, such as the camera 12, the computing device 32, or the like. Regardless of the computing device that embodies the apparatus, the apparatus, such as that shown in FIG. 2, is specifically configured in accordance with an example embodiment of the present invention to facilitate scene segmentation from focal stack images. The apparatus may include or otherwise be in communication with a processor 22, a memory device 24, a communication interface 26 and an optional user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device 24 could be configured to buffer input data for processing by the processor. Additionally or alternatively, the memory device 24 could be configured to store instructions for execution by the processor.

As noted above, the apparatus 20 may be embodied by a computing device. However, in some embodiments, the apparatus may be embodied as a chip or chip set. In other words, the apparatus 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 20 may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 22 may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with the camera 12 that may be any means such as a device or circuitry embodied in either hardware or combination of hardware and software that is configured to capture a plurality of images, video, or the like. In that regard the camera 12 may include any integrated or externally connected digital camera in communication with the apparatus.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more cameras 12 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also optionally include a user interface 28, such as in instances in which the apparatus is embodied by the camera 12 or computing device 32 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Figure 3:
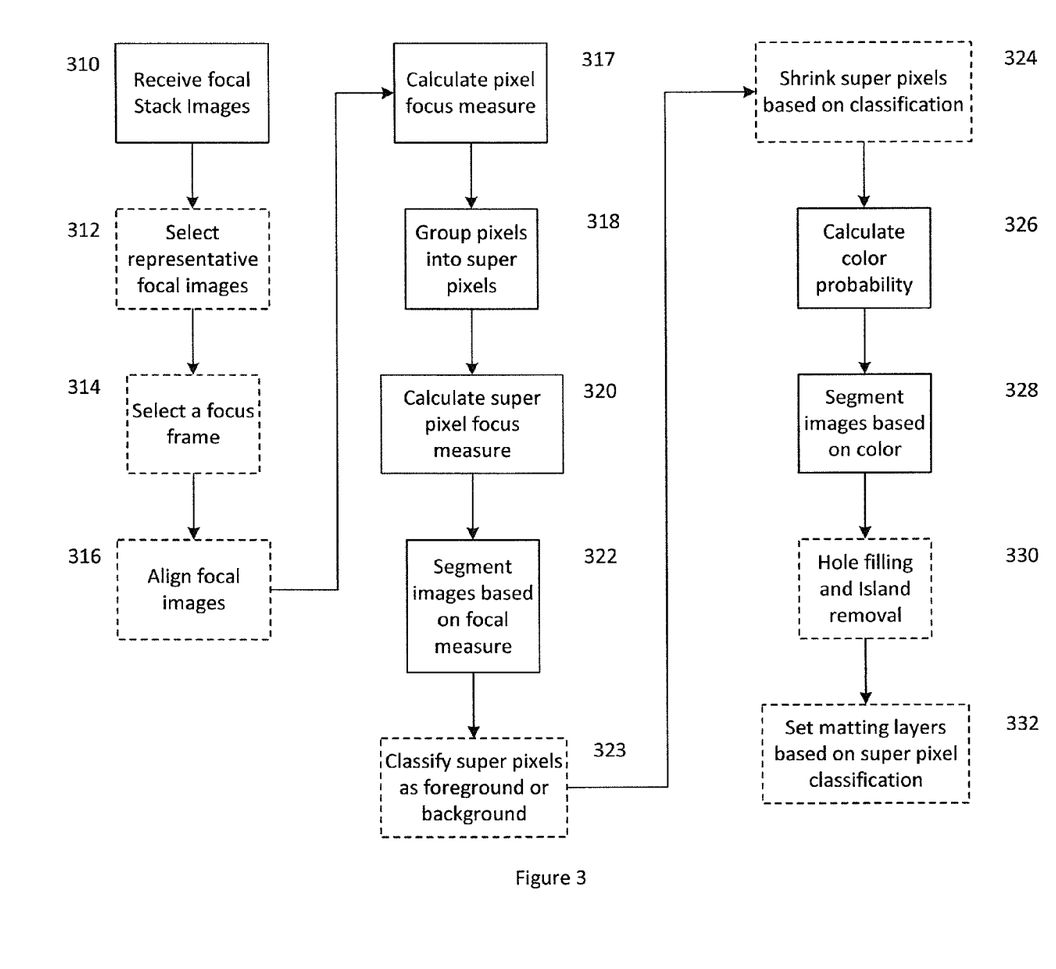
FIG. 3 is a flow chart illustrating the operations performed, such as by the apparatus of FIG. 2, in accordance with an example embodiment of the present invention.
Figure 4:
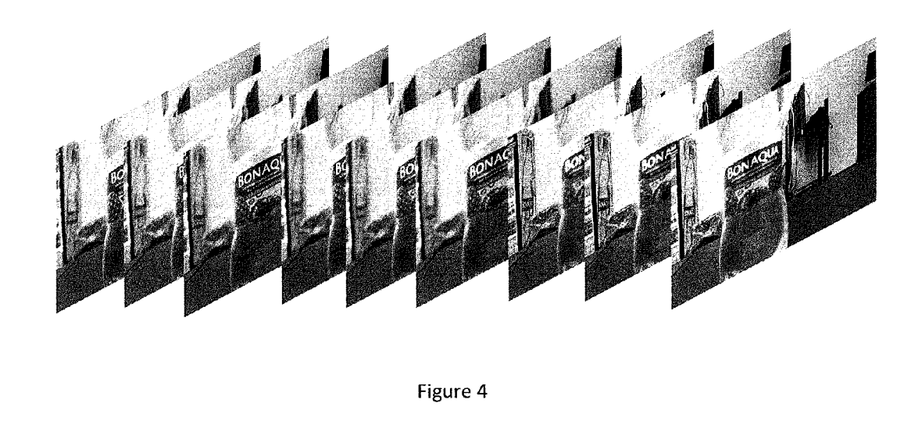
FIGS. 4-15 are exemplary illustrations of an image at various points of the scene segmentation process in accordance with an example embodiment of the present invention.

Referring now to FIG. 3, the operations performed, such as by the apparatus 20 of FIG. 2, apply scene segmentation to focal stock images. As shown in block 310 of FIG. 3, the apparatus may include means, such as the processor 22 or the like, for receiving a set of focal stack images, such as the focal stack images depicted in FIG. 4. In an instance in which the apparatus is equipped with the camera 12, the camera 12 may capture a plurality of images at various focal planes. The camera 12 may provide the plurality of images at various focal planes to the processor 22 and/or memory 24 as a set of focal stack images. In another embodiment, a set of focal stack images is received by the communications interface 26. The communications interface 26 which provides the set of focal stack images to the processor 22 and/or memory 24. If not already stored, the processor 22 may store the set of focal stack images in a device memory 24 and may subsequently receive the set of focal stack images from memory for later processing. Alternatively, the processor may be configured to process the set of focal stack images upon receipt. FIG. 4 illustrates an example embodiment of a set of focal stack images.

Figure 5:
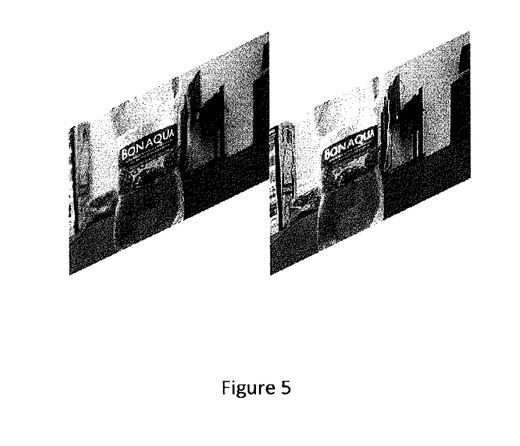

As shown in block 312 of FIG. 3, the apparatus 20 may include means, such as a processor 22 or the like, for selecting one or more representative focal images. The processor 22 may automatically select representative focal images from the set of focal stack images such as the representative images depicted in FIG. 5. In this context, automatic selection includes selection without manual input. In an alternative embodiment a user may select the representative focal images from the focal image stack 30. In an example embodiment, the representative focal images may include an image in which the subject 14 is clearest or most in focus and an image in which the background 16 is clearest or most in focus.

As shown in block 314 of FIG. 3, the apparatus 20 may include means, such as a processor 22 or the like, for selecting a focus frame. A focus frame may be selected by selecting the image in which an identified section is clearest or most in focus on the user interface 28. In an alternative embodiment, the focus frame may be selected by selecting an area of an image or image set which is desired to be in focus using the user interface 28. In this case, the user selected area is recorded and can be used in segmentation process. The user interface 28 may send the focus frame to the processor 22. In an instance in which the focal frame is an area of an image, the processor 22 may select the representative focal image in which the selected focus frame is most in focus. The processor 22 may then use the focus frame in subsequent calculation operations.

As shown in block 316 of FIG. 3, the apparatus 20 may include means, such as a processor 22 or the like, for aligning representative focus frames. The processor 22 may align the representative focal images using image registration. Image registration may be used to estimate the transforms between the images caused by different lens positions and device movement. Image registration applies the estimated transforms to align each image. The representative focal frames are aligned to minimize the geometric differences between the transformed images.

Figure 6:
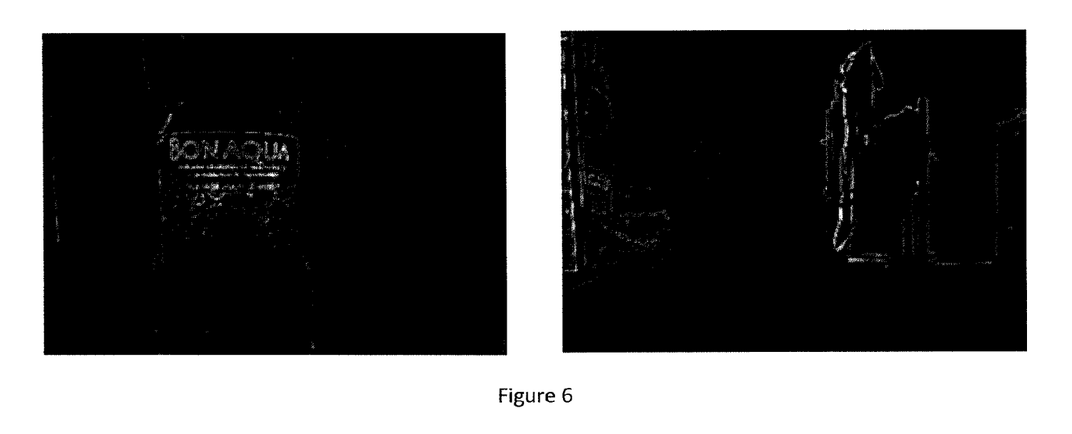

As shown in block 317 of FIG. 3, the apparatus may include means, such as a processor 22 or the like, for calculating the focal measure of each pixel in the representative focal images. The processor 22 may calculate focal measure in various manners including by applying a Laplacian filter, or a combination of a low pass filter and a Laplacian filter, or the like. The application of a low pass filter prior to applying a Laplacian filter may reduce noise. FIG. 6 illustrates an example embodiment of focal measure maps calculated for two representative focal images.

As shown in block 318 of FIG. 3, the apparatus 20 may include means, such as a processor 22 or the like, for grouping pixels of the representative focal images into super pixels. A super pixel may be a group of two or more associated pixels. The pixels may be grouped in various manners, but, in an example embodiment, the processor 22 may apply an over segmentation process to the representative focal images to create super pixels. The over-segmentation process may be an over-segmentation algorithm, such as a Simple Linear Iterative Clustering (SLIC) algorithm, described in Radhakrishna Achanta, et al., SLIC Superpixels Compared to State-of-the-art Superpixel Methods, IEEE Transactions on Pattern Analysis and Machine Intelligence, vol. 34, num. 11, p. 2274-2282, May 2012; a decimation scheme; or the like. In an instance in which a decimation scheme is applied the grouped pixel unit or super pixel is rectangular shaped, while the over-segmentation technique usually results in irregularly shaped super pixels.

Figure 7:
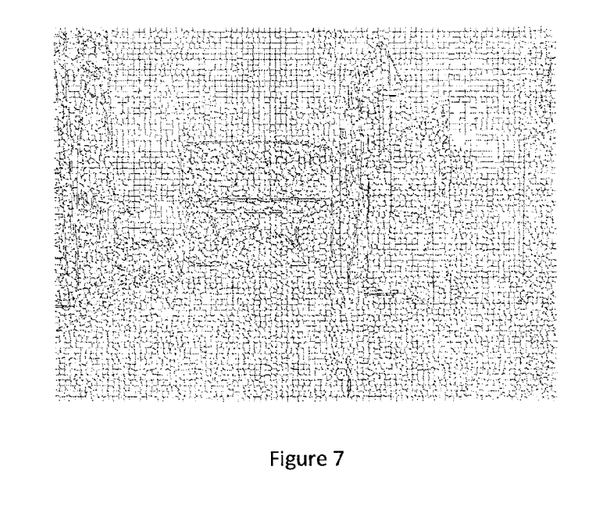

The processor 22 may perform the grouping of super pixels on each representative focal image. Each super pixel may contain a super pixel identity (ID); geometric center coordinates x and y:index of the super pixel neighbors, mean intensity or, in case of color images, mean color values for each color channel for each image; or the like. Various color spaces, such as Red, Green, and Blue (RGB): International Commission on Illumination (CIE) Lab, Cyan, Magenta, Yellow, and Key (black) CMYK; or YCbCr; or the like can be used in the processing. As a non-limiting example, we refer to the color channels as L, a, and b in the following. FIG. 7 illustrates an example embodiment of a grouped super pixel map of a representative focal image. Below is an example of the information contained in a super pixel.

```
Super pixel {
ID
center (x,y)
number of neighboring super pixels
list of neighboring super pixel IDs
list of mean color L for each image
list of mean color a for each image
list of mean color b for each image
list of focus measure for each image
}
```

Figure 8:
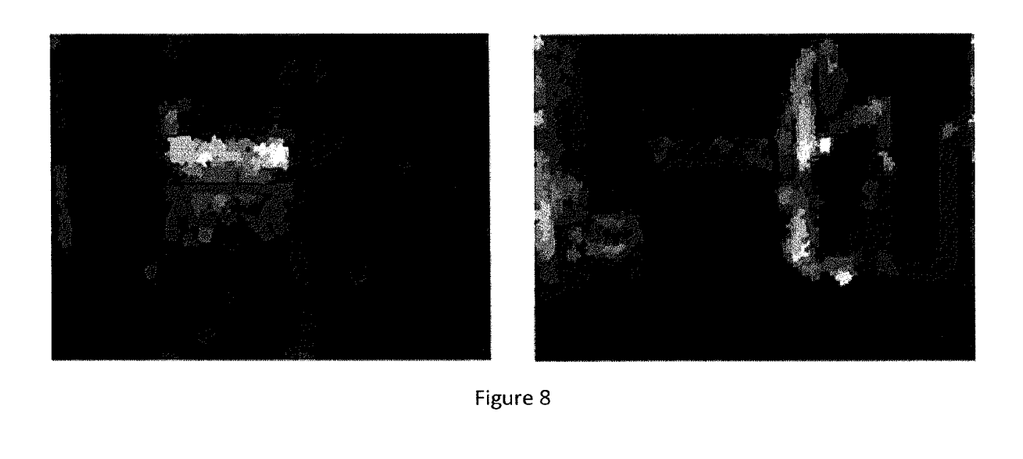

As shown in block 320 of FIG. 3, the apparatus 20 may include means, such as a processor 22 or the like, for calculating the focal measure for each super pixel of each representative image. The processor 22 may calculate the focal measure of each super pixel in various manners, such as by determining the sum of the magnitudes of the Laplacian filter applied to the super pixel region; the maximum magnitude of Laplacian filter response in each super pixel region; or the like. FIG. 8 illustrates an example embodiment of a focal measure map for super pixels in two representative focal images.

Figure 9:
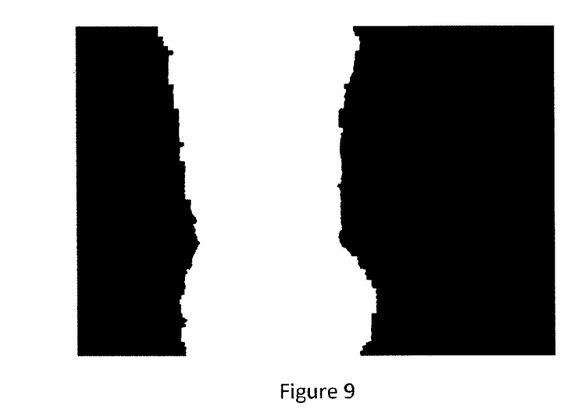

As shown in block 322 of FIG. 3, the apparatus 20 may include means, such as a processor 22 or the like, for segmenting the images based on focal measure of each super pixel. The processor 22 may segment the representative focal images based on focal measure in various methods known in the art such as, an alpha-expansion algorithm as described in Boykov, Y. et al., Fast approximate energy minimization via graph cuts, IEEE Transactions on Pattern Analysis and Machine Intelligence, (Volume: 23, Issue: 11). In an instance in which an alpha-expansion algorithm is used, a data cost may be defined as the focal measure; the user selected area or focal frame which may be recorded from user interface may be integrated into the data cost, such that the data cost for violating the focal frame may be set to an integer representing infinity or very large number. The data cost for ground truth according to the focus frame may be set to zero or a very small number. Binary cost may be defined as Potts model, e.g. larger than one if different labels, zero if the labels are the same, or other terms encouraging smoothness of neighboring labeling. The super pixel focal measure may also be manipulated by decreasing the value for labeling representing the image with the farthest focal measure, or farthest in the background. The manipulation of the super pixel focal measure may result in smoother edges with homogenous backgrounds. The segmentation process may result in each super pixel being assigned a unique label indicating the focus layer to which the super pixel belongs, for example the subject 14 layer or foreground layer may be focal layer 1, and the background 16 layer may be focal layer 2. FIG. 9 illustrates an example embodiment of a focus based segmentation of a representative focal image.

As shown in block 323 of FIG. 3, the apparatus 20 may include means, such as a processor 22 or the like, for classifying the super pixels as foreground or background. The processor 22 may be configured to classify each super pixel of each representative focal image as foreground or background. In an example embodiment, a super pixel may be classified as foreground in the representative focal image if the super pixel belongs to that focal layer. A super pixel may be classified as background if the super pixel belongs to any other focal layer.

Figure 10:
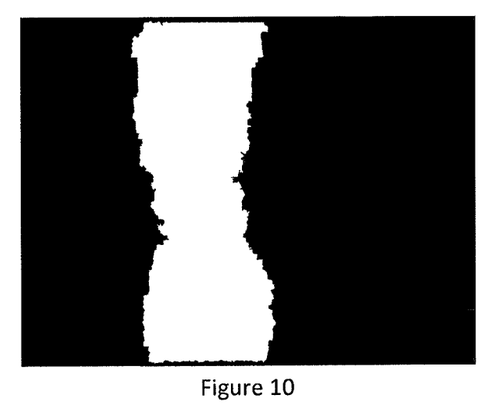

As shown in block 324 of FIG. 3, the apparatus may include means, such as a processor 22 or the like, for shrinking segmentation mask consisting of multiple super pixels based on super pixel classification as foreground or background to remove depth discontinuity regions. The processor 22 may shrink each foreground and background super pixel which is located on the boundary between foreground and background super pixel groupings of each representative image. The shrinking process may be applied to a representative focal image more than once if required or desired to provide a smoother boundary edge. FIG. 10 illustrates an example embodiment of shrinking segmentation mask to remove depth discontinuity regions.

As shown in block 326 of FIG. 3, the apparatus 20 may include means, such as a processor 22 or the like, for calculating super pixel color probability. The processor 22 may classify super pixels remaining after the shrinking process into foreground scribbles and background scribbles on each of the representative images based on their classification in previous operations as foreground or background super pixels. The color density functions of all foreground and background super pixels are calculated as foreground and background super pixel color probability. The super pixel color probability may be estimated by various methods, such as the Fast Gauss Transformation estimation as described in C. Yang et al, Improved fast gauss transform and efficient kernel density estimation, IEEE International Conference on Computer Vision, 2003, pp. 664-671. For example, in an instance in which the set of foreground pixels are labeled as F and the set of background pixels are labeled as B, the likelihood of c_Sp—super pixel Sp with its color c (where c=(L, a, b)) that is belonging to F will be Pr(c_Sp|F)/[(Pr(c_Sp|F)+Pr(c_Sp|B)], where Pr(c_Sp|F) is the foreground color Probability Density Function, which is estimated via fast Gauss transform. The same process may be applied for the background.

Figure 11:
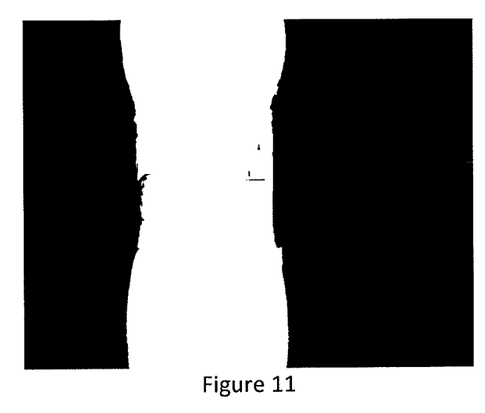

As shown in block 328 of FIG. 3, the apparatus 20 may include means, such as a processor 22 or the like, for segmenting the focal images based on color probability. The processor 22 may segment the representative images based on color probability by various methods, such as a graph cut algorithm as described in Y. Y. Boykov and M. P. Jolly, Interactive graph cuts for optimal boundary and region segmentation of objects in n-d images," in ICCV01, 2001, pp 105-112. User selected area pixels or focus frame pixels which is recorded from user interface module may be integrated in to the graph cut as a larger weight than other areas. FIG. 11 illustrates color probability based segmentation of a focal image.

Figure 12:
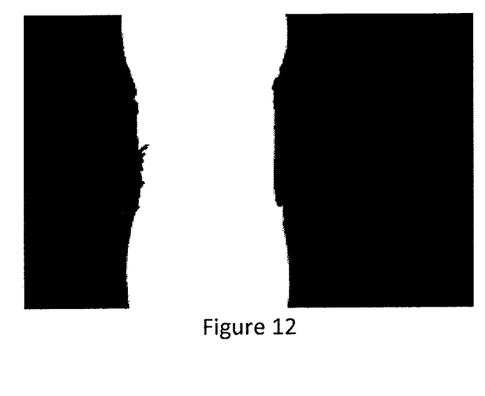

As shown in block 330 of FIG. 3, the apparatus 20 may include means, such as a processor 22 or the like, for filling holes and removing island pixels. The processor 22 may fill holes and remove island pixels based on each pixels classification as foreground or background. For example, for removing island pixels, the processor 22 will remove super pixels or change the super pixel label to match neighboring super pixels in an instance in which a super pixel is defined as a foreground or background and all neighboring super pixels are labeled the opposite. For filling holes, the processor may classify a super pixel if it had not previously been classified, or classification has been removed, to match neighboring pixels. FIG. 12 illustrates an example embodiment of a result of filling and island removal of a representative image.

Figure 13:
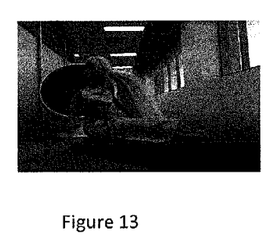
Figure 14:
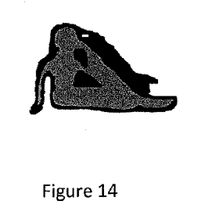
Figure 15:
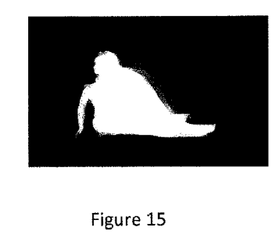

As shown in block 332 of FIG. 3, the apparatus 20 may include means, such as a processor 22 or the like for setting matting layers. The processor 22 may set matting layers based on super pixel classifications and boundary calculations. The matting may have a plurality of layers and, in an example embodiment, a tri-map matting may be generated which may have a foreground layer, a background layer, a boundary layer, or the like. The background layer mask may be a predefined, e.g., 100, percent background super pixels, the foreground layer mask may be a predefined, e.g., 100, percent foreground super pixels, and the boundary layer mask may be a determined percentage of foreground and background colors so that it can be served as alpha channel for possible composition of the segmented foreground scene into a totally difference background. For example a pixel in the boundary layer mask may be 20 percent from the foreground and 80 percent from the background. The determined percentage of both background and foreground pixels may provide enhanced clarity for thin structures such as hair. The relative percentages of foreground and background colors for each pixel in the boundary layer mask may be determined by various boarder matting processes know in the art such as a closed-form matting approach as described in Levin, A. et al., A Closed Form Solution to Natural Image Matting, IEEE Conference on Computer Vision and Pattern Recognition, 2006. FIGS. 13-15 illustrate an example embodiment of the setting matting layers. FIG. 13 illustrates an example of an original image. FIG. 14 illustrates an example of a tri-map of the original image, in which white may be the background layer mask, black may be the boundary layer mask, and the grey may be the foreground layer mask. FIG. 15 illustrates an example of the matting layer result on the original image. When the matting layers may be applied to the original image the super pixels for each area, e.g. foreground, background, and boundary are drawn from the representative focal image in which the area is most in focus.

The grouping of pixels into super pixels prior to segmentation allows for a much more efficient calculation process. The segmentation of super pixels based on both focal measure and color probability allows for more reliable and efficient calculations. Selection of a focal frame may allow for user input to the segmentation process resulting in segmentation tailored to the user preferences with little burden to the user.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 312, 314, 316, 323, 324, 330, and 332 in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method to facilitate scene segmentation of focal stack images, the method comprising:
   receiving a set of focal stack images, wherein a focal stack image comprises a plurality of pixels;
   grouping each of the plurality of pixels to which an over segmentation algorithm or a decimation algorithm is applied based on a shape of the plurality of pixels to create a plurality of super pixels;
   calculating a focal measure for each of the plurality of the super pixels;
   segmenting a respective focal stack image based on the focal measures of the plurality of super pixels;
   calculating a color probability for respective super pixels; and
   segmenting the respective focal stack image based on the color probability of respective super pixels.

2. A method according to claim 1 further comprising:
   selecting a representative plurality of focal images from the set of focal stack images.

3. A method according to claim 1 further comprising:
   aligning the set of focal stack images.

4. A method according to claim 1 further comprising:
   receiving a selection of a focus frame;
   wherein the segmenting the respective focal stack image based on the focal measure is further based on the selected focus frame; and
   wherein the segmenting the respective focal stack image based on color probability is further based on the selected focus frame.

5. A method according to claim 1 further comprising:
   classifying the plurality of super pixels as foreground or background.

6. A method according to claim 5 further comprising:
   shrinking segmentation mask consisting of multiple super pixels based on classification as background or foreground.

7. A method according to claim 5 further comprising:
   removing island pixels based on classification as background or foreground; and
   setting matting layers based on pixel classification as background or foreground.

8. An apparatus to facilitate scene segmentation of focal stack images, the apparatus comprising a processor and a memory including computer program code, the memory and computer program code configured to, with the processor, cause the apparatus to:
   receive a set of focal stack images, wherein a focal stack image comprises a plurality of pixels;
   group each of the plurality of pixels to which an over segmentation algorithm or a decimation algorithm is applied based on a shape of the plurality of pixels to create a plurality of super pixels;
   calculate a focal measure for each of the plurality of the super pixels;
   segment a respective focal stack image based on the focal measures of the plurality of super pixels;
   calculate a color probability for respective super pixels; and
   segment the respective focal stack image based on the color probability of respective super pixels.

9. An apparatus according to claim 8 wherein the memory and computer program code are further configured to, with the processor, cause the apparatus to:
   select a representative plurality of focal images from the set of focal stack images.

10. An apparatus according to claim 8 wherein the memory and computer program code are further configured to, with the processor, cause the apparatus to:
   align the set of focal stack images.

11. An apparatus according to claim 8 wherein the memory and computer program code are further configured to, with the processor, cause the apparatus to:
   receive a selection of a focus frame;
   wherein the segmenting the respective focal stack image based on the focal measure is further based on the selected focus frame; and
   wherein the segmenting the respective focal stack image based on color probability is further based on the selected focus frame.

12. An apparatus according to claim 8 wherein the memory and computer program code are further configured to, with the processor, cause the apparatus to:
   classify the plurality of super pixels as foreground or background.

13. An apparatus according to claim 12 wherein the memory and computer program code are further configured to, with the processor, cause the apparatus to:
   shrink segmentation mask consisting of multiple super pixels based on classification as background or foreground.

14. An apparatus according to claim 12 wherein the memory and computer program code are further configured to, with the processor, cause the apparatus to:
   remove island pixels based on classification as background or foreground; and
   set matting layers based on pixel classification as background or foreground.

15. A computer program product to facilitate scene segmentation of focal stack images, the computer program product comprising a non-transitory computer readable medium having program code portions stored thereon, the program code portions configured, upon execution to:
   receive a set of focal stack images;
   select a representative plurality of focal images from the set of focal stack images, wherein a focal stack image comprises a plurality of pixels;
   group each of the plurality of pixels to which an over segmentation algorithm or a decimation algorithm is applied based on a shape of the plurality of pixels to create a plurality of super pixels;
   calculate a focal measure for each of the plurality of the super pixels;
   segment a respective focal stack image based on the focal measures of the plurality of super pixels;
   calculate a color probability for respective super pixels; and
   segment the respective focal stack image based on the color probability of respective super pixels.

16. A computer program product according to claim 15 wherein the program code portions are further configured, upon execution to
   align the set of focal stack images.

17. A computer program product according to claim 15 wherein the program code portions are further configured, upon execution, to
   receive a selection of a focus frame;
   wherein the segmenting the respective focal stack image based on the focal measure is further based on the selected focus frame; and
   wherein the segmenting the respective focal stack image based on color probability is further based on the selected focus frame.

18. A computer program product according to claim 15 wherein the program code portions are further configured, upon execution, to
   classify the plurality of super pixels as foreground or background.

19. A computer program product according to claim 18 wherein the program code portions are further configured, upon execution, to
   shrink segmentation mask consisting of multiple super pixels based on classification as background or foreground.

20. A computer program product according to claim 18 wherein the program code portions are further configured, upon execution, to
   remove island pixels based on classification as background or foreground; and
   set matting layers based on pixel classification as background or foreground.

21. The method of claim 1 further comprising:
   calculating the focal measure for each of a plurality of pixels of the set of focal stack images.

22. An apparatus according to claim 8 wherein the memory and computer program code are further configured to, with the processor, cause the apparatus to:
   calculate the focal measure for each of a plurality of pixels of the set of focal stack images.

23. A computer program product according to claim 15 wherein the program code portions are further configured, upon execution, to
   calculate the focal measure for each of a plurality of pixels of the set of focal stack images.

* * * * *